April 23, 1946.   R. M. HAMILTON   2,399,021
HIGH SPEED VEHICLE
Filed May 25, 1943   3 Sheets-Sheet 1
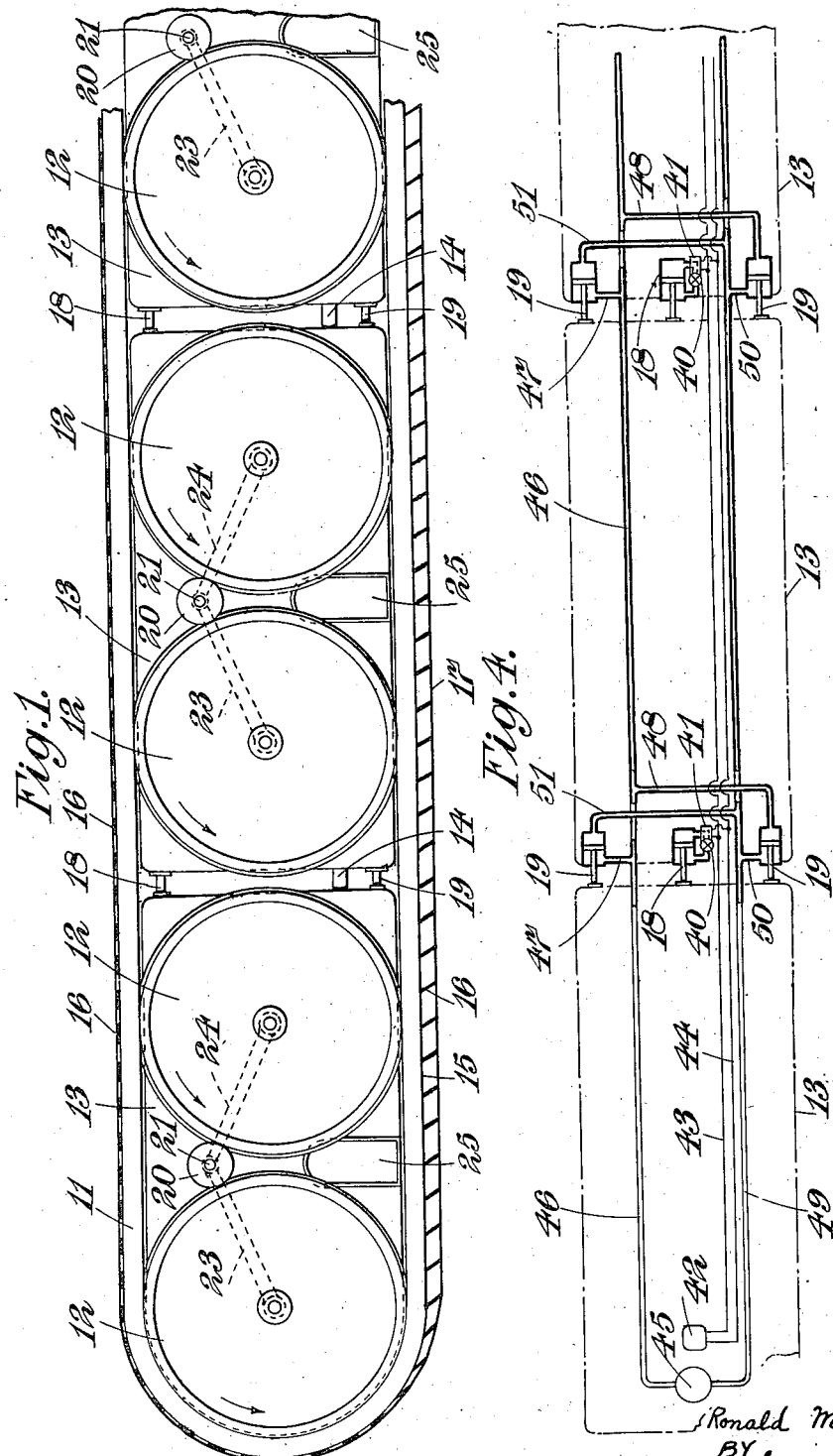
INVENTOR
Ronald Marsden Hamilton
BY Loyd Hall Sutton
ATTORNEY

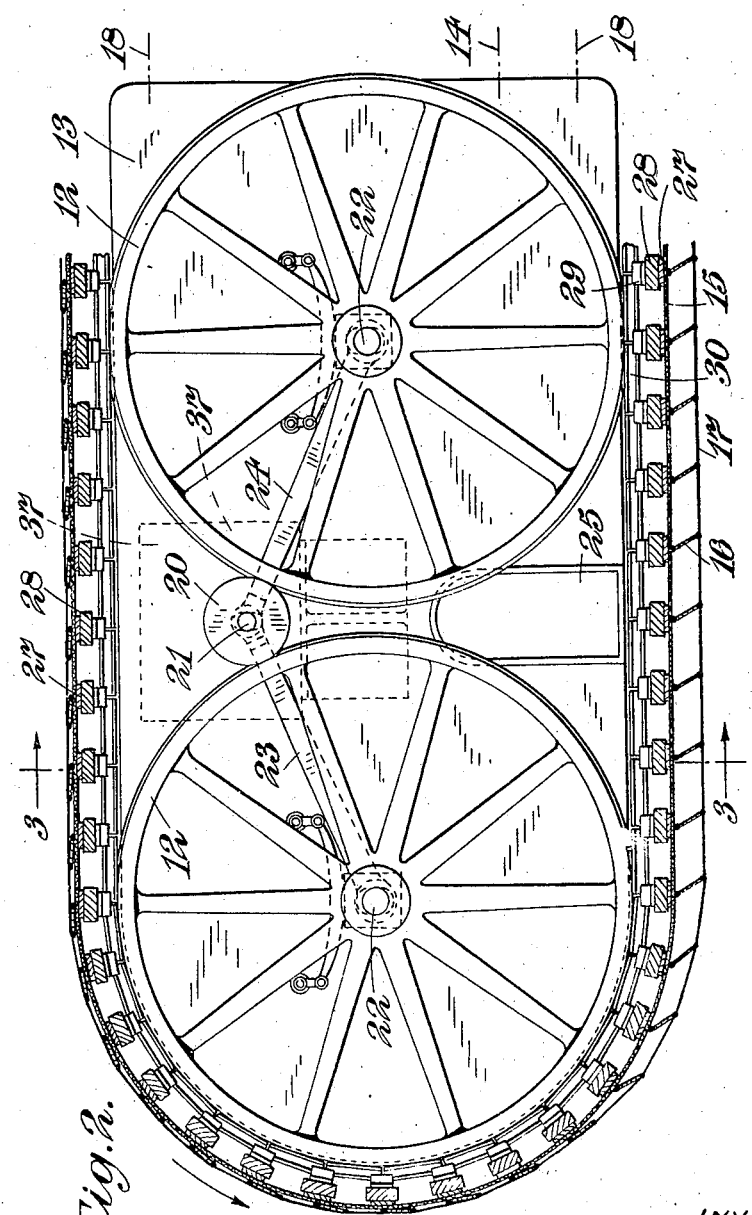

April 23, 1946.  R. M. HAMILTON  2,399,021
HIGH SPEED VEHICLE
Filed May 25, 1943  3 Sheets-Sheet 3
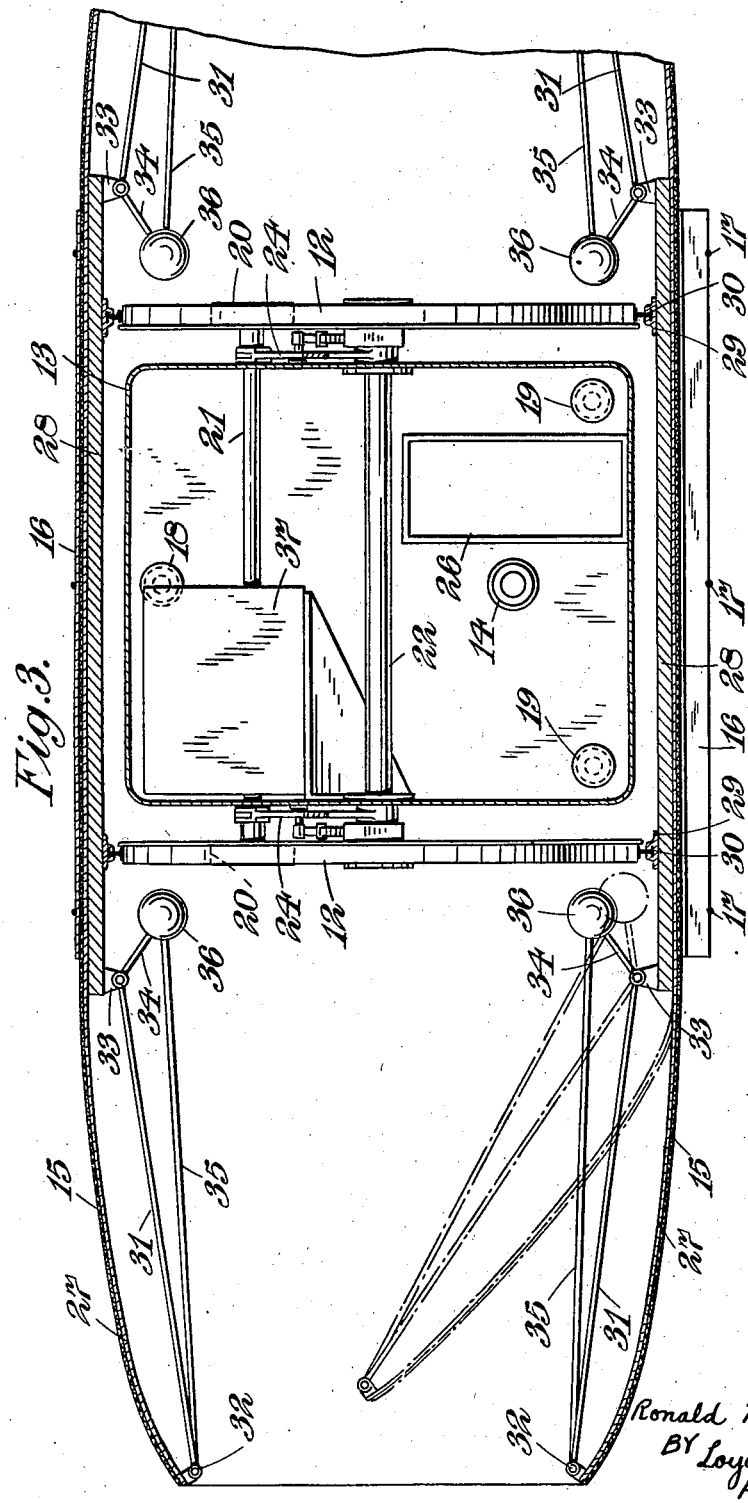
INVENTOR
Ronald Marsden Hamilton
BY Loyd Hall Sutton
ATTORNEY Patented Apr. 23, 1946

2,399,021

UNITED STATES PATENT OFFICE 2,399,021

HIGH-SPEED VEHICLE

Ronald Marsden Hamilton, Churt, Farnham, England

Application May 25, 1943, Serial No. 488,455
In Great Britain June 30, 1941

8 Claims. (Cl. 115—1)

This invention comprises improvements in or relating to high speed vehicles, including under the term "vehicles" all carrying devices for use whether on sea or land.

At hitherto normal speeds of transportation skin friction of the exposed surface of the vehicle with water is one of the smaller resistances to motion but it becomes serious at higher speeds and it cannot be minimised by alteration of the form of the exposed surface, such as is effected by streamlining the parts; streamlining merely affects head resistance and eddy-forming but does not reduce skin friction. Inasmuch as skin friction resistance increases proportionately to the square of the speed it mounts rapidly with increasing speed and constitutes a limiting factor on ultra high speeds; it is an object of the present invention to obviate or reduce its effect.

The invention further provides a vehicle for transport over water utilising special principles of support and propulsion which also permit of the same vehicle being used on land.

In one aspect the invention contemplates the provision of a vehicle comprising a body and driving mechanism and an endless track which surrounds and completely encloses the body and driving mechanism so as to protect the same from contact with the medium of transport (earth or water).

The invention further includes a vehicle for transport over water comprising a body and driving mechanism and endless track, the endless track being broad enough, and stiff enough in a transverse direction, to spread the load laterally and ensure that at the speed of travel of the vehicle the vehicle is able to roll over the surface of the water. As water takes a definite time to escape from beneath the surface of the track, such a vehicle will tend at the front end to rise on to the surface of the water as it rolls forward and, at a suitable speed, will rise out of the water enough to materially reduce the displacement.

Preferably, the body is articulated so as to be flexible in a longitudinal direction. Means may be provided to lock the body at the articulations against angular movement in a vertical plane for reasons hereinafter described. Steering may be accomplished by bending the body, and with it the endless track, transversely at the articulations.

By the provision of suitable paddles at intervals across the track, slip of the track relative to the water can be prevented and no other means of propulsion is necessary; moreover skin friction with the water is entirely obviated and speeds of propulsion at once become possible which are much in excess of any water-borne craft hitherto employed.

The following is a description by way of example of a form of vehicle in accordance with the invention which is intended for high-speed travel over water:

In the accompanying drawings:

Figure 1 is a diagrammatic side elevation of the front part of a vehicle in accordance with the invention;

Figure 2 is a similar view to an enlarged scale of a portion of the part shown in Figure 1, but indicating further constructional features;

Figure 3 is a cross-section upon the line 3—3 of Figure 2 looking in the direction of the arrows, and Figure 4 is a diagram of control connections.

An endless track 11 is provided which runs on wheels 12 arranged in a series along the outside of a train of cars 13, which cars form the body of the vehicle. The cars 13 abut close to one another end to end throughout the vehicle and are articulated together by joints 14 capable of taking tension and compression. The track is surrounded by a cover 15 of waterproof fabric or rubberized material, to which are hinged cross paddles 16 at intervals throughout its length. The edges of the paddles are linked together by an endless flexible cable or cables 17. The wheels 12 are driven counter-clockwise as viewed in Figure 1, that is to say in a direction indicated by the arrows, and the paddles 16 are so disposed that they slope rearwardly in relation to the front of the vehicle, which is at the left-hand end of Figure 1, and thus if the vehicle is running over water, tend to grip the water and afford a means of propulsion which resists being forced rearwardly relatively to the water. As, at the ends of the vehicle, the cables 17 cannot stretch sufficiently to allow the paddles to stand out from the surface of the cover 15, which would require a greater circumference around the curve formed by the track at the end, the paddles are pulled down flat as shown in the drawings, and along the upper surface of the vehicle they naturally do not tend to rise again, but on entering the water on the under side of the track they drop open along the straight portion of the track as shown.

The train of cars 13 which constitutes the body of the vehicle may be of any desired length, even as much as several hundred feet. They contain driving motors for the wheels 12 and they are linked together not only by the articulated joints 14 but also by jack members 18, 19 which are spaced from the articulated joints. The jack members 18 may consist of rams projecting through hydraulic cylinders, the cylinders being located in one of the cars at the joint, and the rams being secured to the other. They are located as far as possible in a vertical direction above the articulated connection 14, and if the hydraulic jacks 18 are locked against movement the train of cars becomes rigid so far as up and down movements are concerned. The jacks 19 are located in pairs at the opposite sides of the cars, one at the left-hand and the other at the right-hand bottom corner, as can be seen in the larger view, Figure 3. If these jacks are extended on one side of the train of cars and contracted on the other, the train will bend in an arc and will carry with it the track and thus steering can be effected. Driving of the wheels 12 may be effected by a smaller wheel 20 located between each pair of the wheels 12 and engaging with the same either frictionally or by gear-teeth cut in the back of the wheels 12 where they do not have to engage the track 11. The drawings show frictional engagement and the wheels 20 are mounted on axles 21 which are linked to the axles 22 of the driving wheels 12, by means of links 23, 24 so that up and down movements of the wheels relatively to the cars do not prevent the wheels 20 from keeping in engagement with the driving wheels.

Between the driving wheels 12 there are lateral-access doors 25 (Figure 1) and between the cars there are corridor doors 26 (Figure 3). It will be apprehended that the driving wheels 12 are preferably of considerable diameter, say about 16 feet, and that they drive the track 11 frictionally by engagement with it both above and below.

Referring now to Figures 2 and 3, the details of the track are as follows: The flexible outer material 15 of the track is made considerably wider than the track as can be seen from Figure 3 of the drawings and within it there are at closely spaced intervals transverse flexible springs 27 which extend across the material 15 for its full width to stiffen it to a limited extent in a transverse direction. On the springs 27 there are sleepers 28 which carry chairs 29 supporting short rail sections 30, forming the track proper. The wheels 12 are flanged to run on the rail sections. It will be appreciated that any other means of providing a continuous flexible track might be adopted, but the track must be capable of carrying considerable weight. It is contemplated in the construction diagrammatically shown in the drawings that the rail sections 30 might be held in the chairs 29 with a rubber liner between the chairs and the rails so as to permit of a certain freedom of movement without necessitating a hinged joint. The sleepers 28 stiffen the track transversely for some distance beyond the rails 30, and beyond this the springs 27 afford a further means of lateral distribution of weight.

The springs 27 are sufficiently flexible to permit the sides to bend upwardly, as shown for example in chain-lines at the left-hand side of Figure 3, when the vessel is floating at rest upon the water and to afford enough buoyancy under these conditions. As already explained, when the vessel rides forwardly at a sufficient speed it will, at all events at the front end, ride on to the surface of the water and the springs 27 will be sufficiently stiff to hold the lateral margins of the material 15 outwards as shown in full lines.

The margins of the endless track are linked, by rods 31 jointed to them at 32 to brackets 33, on the ends of the sleepers 28. Other rods 34, 35 support counterweights 36 which are disposed between the ends of the sleepers and the driving wheels 12, the system of rods 31, 34, 35 constituting a form of triangulated lever. The purpose of the counterweight 36 is to assist the springs 27 to hold the track outwardly and upwardly when it is travelling along the top over the cars 13, so that there is no tendency for the track to hang down in folds at the edges. At the same time the counterweights 36 assist the track to bend up into the position shown in chain-lines in Figure 3 under the influence of water pressure when such bending is necessary.

Any desired means for driving the wheels 12 may be adopted. In the drawings a motor is indicated as enclosed in a casing 37 on the shaft 21 and there will be a similar motor in each of the cars 13 so that all the wheels are driving wheels.

It can be shown mathematically that a vehicle of the kind just described, if made of a size such that the train of cars is equivalent to the size of a railway train, will propel itself over water at speeds of the order of a railway train or higher. The structure would naturally float when at rest but on the vehicle being started, the front end would rise to the surface of the water. The structure being flexible in a lengthwise direction would assume a sinusoidal shape, being deeper in the water further from the front. The wave length of the sinusoidal curve which the vehicle would assume depends upon its speed relative to the water, and the depth from crest to trough is double the mean draught of the vehicle. The period of the motion varies with the square root of the draught. This possibility of the vehicle assuming a sinusoidal configuration as viewed in side elevation is an important feature of the invention, quite apart from the elimination of skin friction, because of the possibility of reducing wave formation and therefore reducing the longitudinal stresses which are developed in a rigid structure due to wave formation. It has not hitherto been appreciated that the configuration of a vessel moving over water should be a function of its speed, but by the provision of a flexible vehicle or vessel in accordance with the present invention it is possible for the configuration to be a function of the speed.

On smooth water the sinusoidal configuration would naturally be most nearly attained. This configuration will be imparted to the vehicle because of the tendency of the vehicle to fall through the water from the surface on which it rides at the front end and to the balancing tendency of the water to push the vehicle upwards. As will be evident, the presence of waves in rough seas will tend to modify the sinusoidal curve and, as waves pass along the vessel from front to rear, would give the occupants a sensation of riding over a rough road, a condition which would be absent in perfectly smooth water. In order to smooth out these roughnesses of travel it is desirable that when the vehicle has attained the speed at which it is intended to proceed, it should be possible to render the structure rigid so that it is not disturbed by the passage of waves. The general sinusoidal configuration will thus be maintained at the appropriate speed which corresponds to the speed of travel while the minor variations of the configuration which would otherwise be caused by the passage of waves are damped out or prevented in the case of waves of short wave length. With waves of great wave length there will be a slow up-and-down movement.

To this end the cars 13 of the train which are supported within the endless track 11 of the vehicle, although articulated as already described, are provided with means to lock them at their junction with one another in any given angular relationship. If this is done the vehicle can be safely brought up to very high speeds of travel without danger of shaking itself or its occupants unduly, and propulsion at exceedingly high speed comes into view.

The means for locking the cars of the train within the envelope consist of the hydraulic jacks 18 located between the cars at the top. The jacks 18 are made double acting and provided with means to permit the fluid to flow from one end of their cylinders to the other through a locking-valve 40 on each jack. On closing the valve the jack becomes locked against movement and if all the valves 18 throughout the length of the train of cars are closed, the train, and with it the vehicle as a whole, becomes rigid against up and down movement. The locking-valves 40 are provided with electro-magnetic control means 41 not shown in detail in the diagram, Figure 4, and all the control means are capable of being energized simultaneously by means of an electric circuit 43, 44 connected to a control switch 42 at the driving station of the vehicle. The navigator is able by partially releasing the locking-valves 40 to permit the vehicle to assume a sinusoidal shape in accordance with the speed of travel and then to lock the points of articulation so as to prevent vibration from arising. The hydraulic jacks 18 act as vibration dampers even when the valves are open partially, so that dangerous or rapid vibrations are resisted even during the periods when the locking-valves 40 are open for the purpose of adjusting the shape of the vehicle while it is travelling over water.

The vehicle can be steered in various ways, for example a rudder can be provided on one or more of the cars 13 carried on a laterally projecting bracket so that it can project outside the track and dip into the water, but preferably steering is effected by means of the jacks 19 located at the lower bottom corners of the cars 13. By contracting the jacks on one side and simultaneously expanding the jacks on the other, the vehicle is caused to take a curved shape as viewed in plan and will therefore move round in an arc. This is effected by means of the pump 45 which is able to transfer hydraulic fluid from the jacks one one side of the cars to the jacks on the other. Such a pump may be driven under the control of the navigator by a reversible electric motor. As shown in the drawings, the jacks 19 are double acting and the pipe-line 46 on one side of the vehicle is connected to the back ends of the cylinders of the jacks on that side by branches 47 and also to the front ends of the jacks on the opposite side of the vehicle by means of branches 48. Similarly, the other pipe-line 49, which is used for expanding the jacks on the other side of the vehicle, is connected by branches 50 to the back ends of the jack cylinders on said other side and by branches 51 to the front ends of the jack cylinders remaining. The jacks 19 are sufficiently close to the level of the articulated joints 14 to obviate any risk that they would interfere with assumption of the sinusoidal shape by articular movement in a vertical plane.

It is also possible to steer a vehicle of the general type which has been described if the envelope is made in two parts which while normally moving forward at the same speed as one another can, when desired, be made to move at a differential speed, the part on the side which is to run on the outside of the curve of the course followed being made to overrun somewhat the part of the envelope which lies on the inside of the curve of the course. Such method of steering is parallel to that adopted for the endless track type of tank vehicle. It would, however, obviously involve a more complicated mechanical construction than steering which is attained by a rudder or by bending of the train.

I claim:

1. A vehicle for transport over water comprising in combination a body comprising a series of articulated elements, an endless track, which surrounds and completely encloses the body longitudinally, motive power means within the body for driving the endless track, and means to lock the body at the articulations against angular movement in a vertical plane.

2. A vehicle for transport over water comprising in combination a body consisting of a series of articulated elements, an endless track surrounding and completely enclosing the body longitudinally, the endless track being broad enough, and stiff enough in a transverse direction, to spread the load laterally and to ensure that at the speed of travel of the vehicle, the vehicle is able to roll over the surface of the water, motive power means within the body to drive the endless track, and means to lock the body at the articulations against angular movement in a vertical plane.

3. A vehicle for transport over water comprising in combination a body consisting of a series of articulated elements, an endless track surrounding and completely enclosing the body longitudinally, the endless track being broad enough, and stiff enough in a transverse direction, to spread the load laterally and to ensure that at the speed of travel of the vehicle, the vehicle is able to roll over the surface of the water, motive power means within the body to drive the endless track, jacks interconnecting the articulated portions of the body at a suitable spacing from the centre of articular movement and control means for the jacks to extend and contract and lock the same at will whereby control of the articulations is effected.

4. A vehicle for transport over water comprising in combination a body consisting of a series of articulated elements, an endless track surrounding and completely enclosing the body longitudinally, the endless track being broad enough, and stiff enough in a transverse direction, to spread the load laterally and to ensure that at the speed of travel of the vehicle, the vehicle is able to roll over the surface of the water, motive power means within the body to drive the endless track, jacks displaced laterally with respect to the centre of articular movement, and a single control means to move all the jacks simultaneously at all the articulated joints, whereby steering may be effected by extending and contracting the jacks.

5. A vehicle for transport over water comprising in combination a body consisting of a series of articulated elements, an endless track surrounding and completely enclosing the body longitudinally, the endless track being broad enough, and stiff enough in a transverse direction, to spread the load laterally and to ensure that at the speed of travel of the vehicle, the vehicle is able to roll over the surface of the water, motive power means within the body to drive the endless track, double-acting jacks connecting the articulated parts with one another, by-pass pipes which interconnect opposite ends of the jacks and locking valves in the by-pass pipes.

6. A vehicle for transport over water comprising in combination a body comprising a series of articulated elements, an endless track, which surrounds and completely encloses the body longitudinally, motive power means within the body for driving the endless track and wheels on each of the articulated elements of the vehicle body engaging the track said wheels being large enough to engage the track both above and below the body.

7. A vehicle for transport over water comprising in combination a body consisting of a series of articulated elements, an endless track surrounding and completely enclosing the body longitudinally, the endless track being broad enough, and stiff enough in a transverse direction, to spread the load laterally and to ensure that at the speed of travel of the vehicle, the vehicle is able to roll over the surface of the water, motive power means within the body to drive the endless track and wheels on each of the articulated elements of the vehicle body engaging the track said wheels being large enough to engage the track both above and below the body.

8. A vehicle for transport over water comprising in combination a body consisting of a series of articulated elements, an endless track surrounding and completely enclosing the body longitudinally, the endless track being broad enough, and stiff enough in a transverse direction, to spread the load laterally and to ensure that at the speed of travel of the vehicle, the vehicle is able to roll over the surface of the water, motive power means within the body to drive the endless track and cross paddles on the endless track to enable it to grip the water, the cross paddles being hinged to the track and connected at their free edges by connecting members substantially as and for the purpose described.

RONALD MARSDEN HAMILTON.